Aug. 2, 1966 W. GOHL 3,264,394
METHOD OF SEALING A STORAGE BATTERY CASING
Filed Dec. 9, 1964

INVENTOR.
Walter Gohl
BY Michael J. Striker
Atty

United States Patent Office 3,264,394
Patented August 2, 1966

3,264,394
METHOD OF SEALING A STORAGE
BATTERY CASING
Walter Gohl, Waiblingen, Germany, assignor to
Robert Bosch G.m.b.H., Stuttgart, Germany
Filed Dec. 9, 1964, Ser. No. 417,033
Claims priority, application Germany, Oct. 21, 1960,
B 59,817
6 Claims. (Cl. 264—263)

The present application is a continuation-in-part of my copending application Serial No. 144,435, filed October 11, 1961, and entitled "Method of Joining Solid Bodies" and now abandoned.

The present invention relates to a storage battery casing and a method of sealing the same, and more particularly, the present invention is concerned with the joining of thermoplastic solid elements forming portions of the casing of a storage battery.

It has been proposed to join thermoplastic elements by softening surface portions thereof which are to be joined to each other, either by the application of solvents or by heating such surface portions at least to plastic consistency. The heat required for the softening or melting of the thermoplastic surface portions was applied either by radiation or by convection. For instance, a hot gas was blown against the surface portions which were to be joined, or hot metal members were brought in contact with such surface portions.

However, such metallic heat conveying members either must be removed after imparting the desired high temperature to the thermoplastic surface portions, or will remain embedded in the joined thermoplastic structure. When withdrawing the metallic heat-conveying members, frequently a portion of the thermoplastic material will adhere to the same and it will be necessary to clean the metallic members prior to using the same again. The application of a heating gas is difficult because the thermoplastic surface portions may be unevenly heated or locally overheated and this might affect the appearance of the joined product or even render the same useless. The same difficulties occur when heat is conveyed by radiation. On the other hand, direct heating by high frequency radiation requires relatively expensive apparatus and more involved procedure. Furthermore, even by applying high frequency heat, it is often difficult to achieve an even heating particularly of the irregular or difficultly accessible joining areas. The above-mentioned difficulties present a serious problem in the joining of thermoplastic portions of a storage battery such as a hollow housing and a cover therefor.

It is therefore an object of the present invention to overcome the above discussed difficulties in the joining of thermoplastic members of a storage battery.

It is another object of the present invention to provide a method which will permit the joining of thermoplastic members, such as the housing and the cover of a storage battery, in a simple and economical manner.

Other objects and advantages of the present invention will become apparent from a further reading of the description and of the appended claims.

With the above and other objects in view, the present invention contemplates a storage battery casing, comprising, in combination, a first hollow casing part having an open end and an end face about the open end, a second casing part extending over the open end of the first casing part and having an end face abutting against the end face of the first casing part, the end faces consisting of thermoplastic material and each being formed with an endless groove extending from the respective end face into the respective part, the endless grooves forming together a closed channel about the open end, and passage means extending through one of the casing parts and communicating with the channel so that upon introducing liquefied thermoplastic material through the passage means into the closed channel the face portions forming the closed channel will become liquefied and will form an integral mass with the thus introduced liquefied thermoplastic material, and upon cooling of the thus formed integral mass so as to solidify the same the storage battery casing will be hermetically sealed.

The present invention also includes a method of welding together a hollow open storage battery housing and a cover therefor, the housing and the cover consisting of thermoplastic material and the cover when placed onto the housing defining therewith an endless closed channel formed with at least one inlet opening, comprising the steps of placing the cover onto the housing so as to form the endless closed channel therebetween, filling through the inlet opening the closed channel under pressure with a liquefied thermoplastic material, the liquefied thermoplastic material rendering the surface portions of the housing and the cover, respectively, which define the closed channel into like liquefied condition so as to form of the liquefied thermoplastic material and of the liquefied surface portions an integral mass, and solidifying the integral mass, thereby firmly joining the housing and the cover to each other.

Thus, according to the present invention the difficulties and disadvantages of the above-discussed prior art methods are avoided, and the joining of the thermoplastic members of the storage battery is carried out in a simple and effective manner by filling the closed endless channel formed between the housing portion and the cover of a thermoplastic storage battery under pressure with liquefied thermoplastic material so that upon contact between the thus introduced liquefied thermoplastic material and the walls of the endless channel, the surface portions of the walls of the endless channel will be molten and thereby will become integral with the introduced flowable mass with which the surface portions were contacted under pressure.

If the flowable mass is liquefied by the application of a solvent then, such solvent must be so chosen as also being capable of dissolving the surface portions of the plastic members which are to be joined, i.e., the walls of the endless channel, and the proportion of solvent in the flowable mass must exceed the proportion thereof which is required for maintaining such joining mass in flowable condition so that solvent will be available for the dissolving of the surface portions, of for instance the housing and the cover of the storage battery which form the endless channnel therebetween.

If the plastic material which is applied under pressure against these surface portions of members which are to be joined is maintained in flowable condition by application of heat, then the temperature of the flowable mass must be sufficiently high to cause melting of the surface portions with which the heated flowable mass comes in contact. Upon subsequent cooling, or removal of the solvent, for instance by evaporation, the surface portions of the members which are to be joined and the flowable mass which has been applied to the same will harden into a unitary solid body and thereby will firmly adhere and join the plastic members such as the housing and the cover of the storage battery to each other, forming a hermetic seal therebetween.

Thus, according to the present invention it is possible in a very simple and quick manner to join the thermoplastic housing and cover of a storage battery even along surface portions thereof which are not easily accessible or which form interior channels in the structure obtained by juxtaposing the housing and the cover in the position in which they are to be joined to each other. It is particularly adventageous to introduce the flowable joining mass under pressure through an opening into an otherwise closed cavity such as the above-mentioned endless channel which is defined by surface portions of the housing and the cover of the storage battery which are to be joined to each other.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
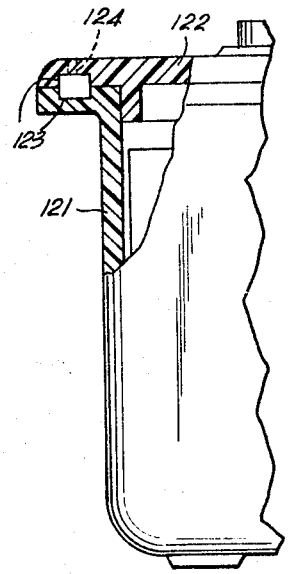
FIG. 1 is a fragmentary elevational view, partly in cross-section of a storage battery casing.

Referring now to the drawings, and particularly to FIG. 1, housing 121 and cover 122 of the thermoplastic storage battery are shown juxtaposed so as to define between these two thermoplastic members a closed annular channel 123. The entire walls of channel 123 are formed by portions of the surfaces of housing 121 and cover 122. Bore 124 is arranged either in the cover or in the housing, or in the interface of cover and housing. Through bore 124, a flowable synthetic mass which has been heated to above its melting point is introduced into channel 123. The thus introduced hot thermoplastic mass will fuse with the channel-forming surface portions of housing 121 and cover 122, and in this manner after cooling and solidification of the thermoplastic mass, a firm joint will be formed between housing 121 and cover 122 which joint is not visible from the outside. In similar manner, as illustrated in FIG. 1 for the joining of housing 121 and cover 122 it is also possible to join battery cell separating walls with the inner face of cover 122.

In order to increase the strength of the joint formed by introduction of the molten thermoplastic material it is frequently desirable to form the channel which is to be filled with the liquid thermoplastic mass which branch channels having dead ends and extending preferably perpendicular to the main channel. In this manner, i.e., by filling not only the main channel but also the branch channels which communicate with the main channel with flowable thermoplastic mass, a very firm anchoring between the thermoplastic elements which are to be joined and the introduced thermoplastic mass is accomplished. It is, of course, also possible to join in a single operation not only two thermoplastic members but a greater number of such thermoplastic elements or members.

Figure 2:
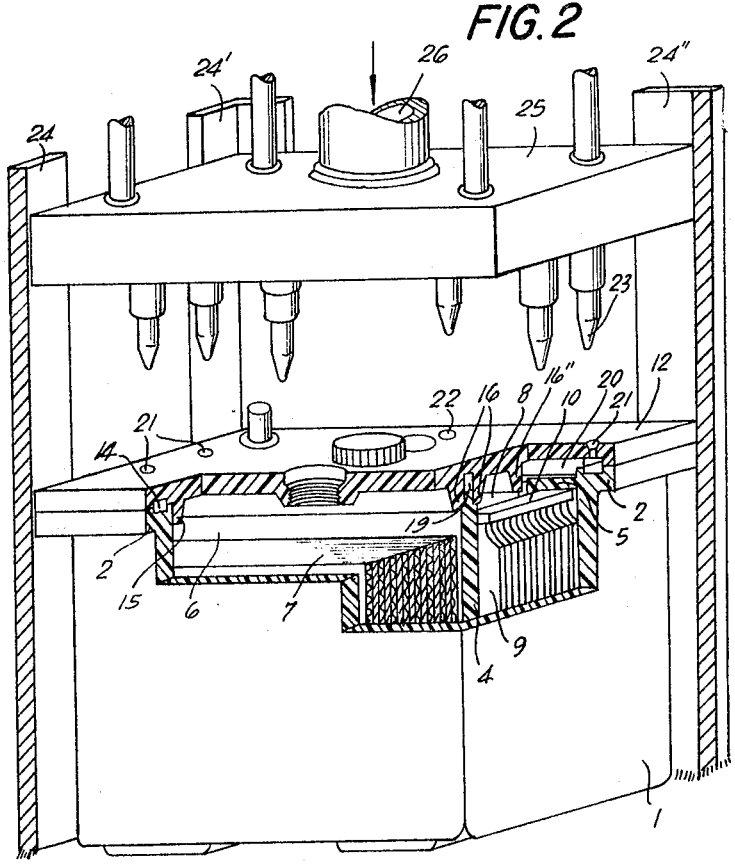
FIG. 2 is a perspective view partially in cross-section of the storage battery including a thermoplastic housing and cover, and of an apparatus for injecting liquefied thermoplastic material into the closed endless channel formed between the housing and the cover.
Figure 3:
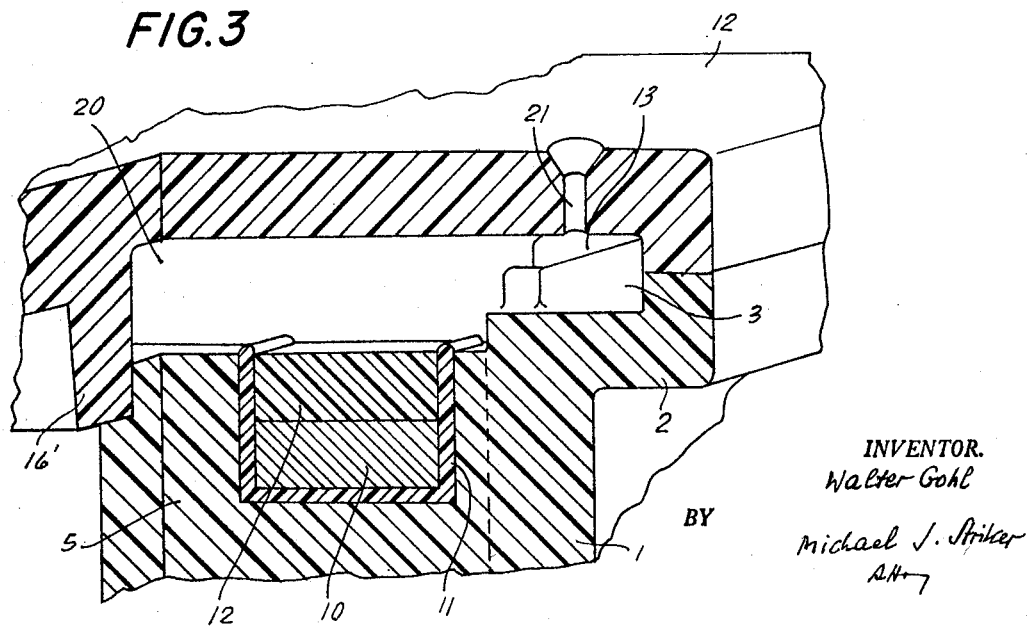
FIG. 3 is an enlarged view of a portion of the storage battery casing shown in FIG. 2.

Referring now to FIGS. 2 and 3 of the drawing, a rectangular hollow storage battery housing 1 is shown having an open upper end and consisting for instance of polyvinyl chloride. The upper edge 2 of the side wall of housing 1 is outwardly enlarged in flange-like manner and formed with an annular groove 3 which is open in upward direction. Furthermore, housing 1 includes two somewhat shorter cell separating walls 4 and 5 which divide the interior of housing 1 into three separate cells.

In the first cell 6 of these separate cells, the electrode plates 7 are partially cross-sected, in the second cell 8, however, complete electrode plates 9 as well as their terminal connecting bridge 10 are shown. As illustrated in an enlarged cross section in FIG. 3, the connecting bridge 10 to the third cell which has not been shown is fixed with resilient rubber frame 11 and with an intermediate body 12 which also consists of polyvinyl chloride in a gas-tight manner in a corresponding opening in cell separating wall 5.

For the closing of housing 1 which contains all of the elements to be incorporated into the storage battery, cover 12 is provided which cover also consists of polyvinyl chloride and is formed at its lower face with an annular groove 13 corresponding to groove 3 of housing 1 and forming together with the same a closed endless or annular channel 14. Furthermore, cover 12 has at its lower face downwardly extending flanges 15 which contact the inner face of the top portion 2 of container 1. Adjacent to each of cell separating walls 4 and 5, are arranged two flanges 16 and 16' which extend downwardly from the lower face of cover 2 and which pairs of flanges, respectively, contact and tightly embrace the upper edges of the cell separating walls 4 and 5. The intervening spaces 19 and 20 which remain free form each a closed channel which at its two end portions communicates with the outer closed annular channel which is formed by grooves 3 and 13. In the area of contact or communication between these channels, injection conduits 21 are provided which open into the upper face of the cover. In addition, at about the middle of each longitudinal wall of the cover 12 a further injection conduit 22 opening into the upper face of cover 12 and communicating with the closed annular channel 14 is provided.

As shown in FIG. 1, six nozzles 23 are located and extend from the bottom of container 25. Container 25 is filled through conduit 26 with liquid thermoplastic material such as molten polyvinyl chloride, and may be moved upwardly or downwardly between four guide rails of which guide rails 24, 24' and 24" are shown in the drawing. Container 25 may be moved downwardly so that nozzles 23 will be inserted into the openings of channels 21 and 22 in the upper face of cover 12. Thereby, pressure will be exerted by the nozzles against cover 12 so that the same will be pressed against the upper edges 2 of housing 1. Thereafter, through pressure conduit 26, polyvinyl chloride which has been heated above its melting point and is in liquid condition will be introduced into pressure container 25 and nozzles 23 and from there through channels 21 and 22 into the entire system of closed channels formed between housing 1 and cover 12 so that the closed channel-forming grooves 3 and 13 as well as 19 and 20 will be filled with the liquefied polyvinyl chloride having a temperature above the melting point of the polyvinyl chloride. Since the walls of all channels in the cover and between the cover and the housing are also formed of the same material i.e., polyvinyl chloride, a complete intermelting and integration of the channel walls with the injected synthetic plastic material will take place. The air which is contained in the channels prior to injection of the liquid polyvinyl chloride will escape laterally between the container and the cover due to the high injection pressure, while the liquid thermoplastic material cannot escape in this manner but will solidify as soon as it starts to pass laterally from the respective channel between the contacting faces of the housing and the cover. While it is thus possible for air to escape from the channels under the pressure of the injected liquid thermoplastic material, only very insignificant amounts of the thermoplastic material will penetrate directly adjacent the channels between the contacting faces of the housing and the cover.

After injection has been completed, i.e., after the channels in the cover and particularly the channels formed between the cover and the housing are completely filled with the injected molten thermoplastic material, the liquefied polyvinyl chloride will cool and solidify. Since this cooling proceeds fastest in the vicinity of the metal nozzles 23 and thus the material in channels 21 and 22 will solidify first, it is possible to withdraw pressure container 25 in upward direction after only between about 10 and 15 seconds, without causing a return flow of the solidifying polyvinyl chloride or the like through channels 21 and 22. The battery casing with the cover 12 thus welded to housing 1 may then be removed from the injection device and the same is immediately available for injecting liquid thermoplastic material into the next battery casing.

In this manner, in a very short period of time and in a single working step, the preassembled and superposed battery housing and cover can be welded so as to adhere firmly and liquid-tight to each other.

Thus, the method of the present invention may be carried out by arranging the storage battery-forming members of thermoplastic material such as the housing and the cover in such a manner so as to define an endless channel between predetermined surface portions thereof, filling the channel under pressure with thermoplastic substance in liquid state and having a temperature sufficiently high to liquefy the predetermined surface portions upon contact with the same, so as to form of the liquid thermoplastic substance and the predetermined surface portions of the members of thermoplastic material an integral mass having a temperature above the softening point of the thermoplastic material, and allowing the integral mass to harden, thereby firmly joining the members of the storage battery casing to each other.

The method of the present invention is primarily suitable for joining together members formed of thermoplastic material such as polystyrene, polymethacrylate, polyamide, polyolefines, polyvinyl chloride, polyformaldehyde and the like.

The hardenable mass in liquid condition which is used under pressure for joining the thermoplastic members, may consist of a thermoplastic material identical with that of the thermoplastic members, or of a compatible material which will easily fuse with the material of the thermoplastic members. For instance, it is possible, according to the present invention to employ different types of polystyrene by forming the thermoplastic members which are to be joined of a polystyrene which contains additives in order to improve the impact tenacity of such members, and to use pure polystyrene in heated, liquid condition for joining the members of the storage battery such as the housing and the cover thereof to each other.

The temperature of thermoplastic flowable mass which is used to join the thermoplastic structural members must be sufficiently high to allow the injection of the thermoplastic mass under a pressure of from between 300 to 800 atmospheres. Thus, if the thermoplastic members are to be joined by pressure contact with pure polystyrene, the temperature of the flowable polystyrene mass will have to be between about 200 and 250° C. It is desirable to work at the highest possible temperatures because increase in the temperatures improves the flowability of the mass and thus will make it possible to operate under a relatively lower pressure. Higher temperatures of the flowable mass are also advantageous because they make it possible to transfer more heat to the surface portions of the thermoplastic battery casing members which are to be joined by the flowable mass and thus a better and more intimate fusing between such surface portions and the flowable mass will be achieved. On the other hand, the flowable mass must not be heated to a temperature at which chemical decomposition of the thermoplastic materials or a reaction between the same and the oxygen of the air would occur.

When it is desired to produce the flowable mass by dissolving the plastic material in a suitable solvent, then a solvent is preferably used which will quickly evaporate. Thus, methylene chloride, trichloroethylene or carbon tetrachloride are preferably used. The viscosity of the thus formed solutions preferably will be between $10^2$ and $10^3$ poises and most preferably between about $2 \times 10^2$ and $3 \times 10^2$ poises.

The pressure under which the flowable mass is to be injected will depend on the shape of the channel which is to be formed by the flowable mass and on the viscosity of the latter. Thus, broadly, it is desirable to use pressures of between about 150 and 800 atmospheres. In the case of thermoplastic materials which are made flowable by heating, pressures of between 400 and 700 atmospheres are preferred, while in the case of flowable masses which are produced by dissolving the plastic material in a suitable solvent, a somewhat lesser pressure such as pressure of between 150 and 500 atmospheres will be preferred.

In the case of applying a flowable thermoplastic mass which has been made flowable by heating usually it suffices to heat only the thermoplastic material which is to be injected, however, it is also possible and sometimes desirable to heat the thermoplastic battery casing members or at least the surface portions thereof which will be contacted by the liquid thermoplastic mass, however, preferably only to a relatively low elevated temperature such as a temperature of between about 80 and 100° C.

The following examples are given as illustrative only of the method of the present invention, without, however, limiting the invention to the specific details of the examples.

*Example I*

A battery housing and cover, both made of polyvinyl chloride are juxtaposed and placed in position relative to each other as illustrated in FIGS. 2 and 3 of the drawing, so that surface portions of the housing and of the cover will form between themselves an endless closed channel or a system of closed channels which communicate with the outer atmosphere through a plurality of bores in the cover member, which bores will serve for the injection of the flowable joining mass.

The flowable mass is formed of pulverulent, granulated polyvinyl chloride which has been heated to about 260° C. The thus liquefied polyvinyl chloride mass is then injected into the channel through the above-mentioned bores at a pressure of about 500 atmospheres. Air will be pushed out between the contacting faces of the housing and cover members.

After completion of the injection, the liquid polyvinyl chloride will fill the entire closed channel and, due to its high temperature, will fuse with the adjacent surface portions of the housing and the cover. After allowing the injected polyvinyl chloride to cool at least in bores 21 to a temperature of about or below 100° C., so as to be completely solidified, housing and cover are sufficiently firmly joined to each other so that the thus formed sealed battery casing can be removed from the injection device which is then immediately ready for injecting liquified polyvinyl chloride into the next following assembly of battery housing and cover.

*Example II*

In accordance with FIG. 1 of the drawing, a battery housing and cover consisting of polystyrene may be joined by injecting under pressure into the closed endless channel formed between the battery housing and the cover a flowable mass consisting of a solution of granulated polystyrene in benzene in the proportion of 1:4 by weight. The solution will be injected at a temperature of about 50° C. and at a pressure of about 200 atmospheres through the bore or bores provided in the cover of the battery as shown in FIG. 1. The injection device may be similar to that shown in FIG. 2. In order to achieve quick evaporation of the solvent, the cover and the housing or at least the portions thereof which will contact each other to form the endless channel are heated to about 60° C. As soon as the mass which has been introduced into the closed endless channel has solidified, a firm joint has been formed between the housing and the cover of the battery and the thus joined structure may be removed from the holding or injecting device which has assured proper positioning of housing and cover relative to each other during the injection and cooling of the flowable mass.

It will be understood that each of the elements described above, or two or more together, may also find a useful application in other types of batteries differing from the types described above.

While the invention has been illustrated and described as embodied in a storage battery, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint or prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of welding together a hollow open storage battery housing and a cover therefor so as to form a storage battery casing, said housing and said cover each having a peripheral sealing face with an endless groove in said sealing face, said housing and said cover consisting of thermoplastic material and said endless grooves in said peripheral sealing faces of said housing and said cover defining an endless closed channel formed with at least one inlet opening, comprising the steps of placing said cover onto said housing so as to form said endless closed channel therebetween; filling through said inlet opening said closed channel under pressure with a liquefied thermoplastic material adapted to render the surface portions of said housing and said cover, respectively, which define said closed channel into like liquefied condition so as to form of said liquefied thermoplastic material and of said liquefied surface portions an integral mass; and solidifying said integral mass, thereby firmly joining said housing and said cover to each other and forming thereof, without the use of an extraneous mold, an integral, unitary, thermoplastic body.

2. A method of uniting a thermoplastic hollow open housing portion of a storage battery with a thermoplastic cover for the same, said housing and said cover each having a peripheral sealing face with an endless groove in said sealing face, said endless grooves in said peripheral sealing faces defining—when said cover is placed upon said housing so as to close the same—a closed endless channel formed with at least one inlet opening located in said cover, comprising the steps of placing said cover upon said open housing so as to close the same and to form said closed endless channel; filling through said inlet opening said closed channel under pressure with a liquefied thermoplastic material being adapted to be solidified and being in such condition as to be adapted to render the surface portions of said housing and said cover which define said closed conduit into like liquefied condition and also adapted to be solidified, so as to liquefy said surface portions and to form of said liquefied thermoplastic material and of said liquefied surface portions an integral liquefied mass; and allowing said integral mass to solidify, thereby firmly joining said housing and said cover to each other and forming thereof, without the use of an extraneous mold, an integral, unitary, thermoplastic body, thus sealing said storage battery.

3. A method of uniting a first solid thermoplastic member forming an open housing of a storage battery with a second thermoplastic member forming a cover for said open housing, said housing and said cover each having a peripheral sealing face with an endless groove in said sealing face, said endless groove in said peripheral sealing faces defining—when said cover is placed on said open housing—a closed channel formed with at least one inlet opening, comprising the steps of placing said cover on said housing; filling through said inlet opening said closed channel under pressure with a molten thermoplastic substance having a temperature above the melting point of the walls of said closed channel and sufficiently high to melt the surface portions of said first and second members which define said closed channel, so as to melt said surface portions and to form of said molten thermoplastic substance and of said molten surface portions an integral mass having a temperature above the softening point of said first and second thermoplastic members; and cooling said integral mass to below the softening point of said thermoplastic members and said thermoplastic substance so as to solidify said integral mass, thereby firmly joining said housing and said cover to each other and forming thereof, without the use of an extraneous mold, an integral, unitary, thermoplastic body.

4. A method of uniting two solid thermoplastic members forming portions of the housing of a storage battery, each of said solid thermoplastic members having an endless elongated peripheral sealing face including an endless strip-shaped face portion spaced from both edges of said peripheral sealing face, at least one of said endless strip-shaped portions consisting of a groove in the respective sealing face, comprising the steps of placing said solid thermoplastic members with their peripheral elongated sealing faces in contact with each other so that said endless strip-shaped portions thereof form a closed channel with at least one inlet opening; filling through said inlet opening said closed channel under pressure with a molten thermoplastic substance having a composition substantially identical with that of said thermoplastic members and having a temperature above the melting point of said thermoplastic members and, sufficiently high to melt the surface portions of said first and second members which define said channel, so as to melt said surface portions and to form of said molten thermoplastic substance and of said molten surface portions an integral mass having a temperature above the softening point of said first and second thermoplastic members; and cooling said integral mass to below the softening point of said thermoplastic members and said thermoplastic substance so as to solidify said integral mass, thereby firmly joining said solid thermoplastic members to each other and forming thereof, without the use of an extraneous mold, an integral, unitary, thermoplastic body.

5. A method according to claim 1 wherein said thermoplastic materials are polyvinyl chloride.

6. A method according to claim 1 wherein said thermoplastic materials are selected from the group consisting of polystyrene, polymethacrylate, polyamide, polyvinyl chloride and polyolefines.

References Cited by the Examiner

UNITED STATES PATENTS

| | | | |
|---|---|---|---|
| 2,388,042 | 10/1945 | Dailz | 264—263 X |
| 2,724,012 | 11/1955 | Thompson | 136—166 |
| 2,859,483 | 11/1958 | High et al. | 264—229 |
| 2,862,543 | 12/1958 | Kaminsky | 264—263 X |
| 2,980,752 | 4/1961 | Toce et al. | 136—166 |
| 3,095,261 | 6/1963 | Meyer | 264—263 |
| 3,095,993 | 7/1963 | Balcom et al. | 220—5 |
| 3,117,174 | 1/1964 | Hessinger et al. | 264—263 |
| 3,120,572 | 2/1964 | Shannon | 264—261 |

ROBERT F. WHITE, *Primary Examiner.*

F. MARLOWE, L. S. SQUIRES, *Assistant Examiners.*